United States Patent
Brown et al.

(10) Patent No.: US 7,362,357 B2
(45) Date of Patent: Apr. 22, 2008

(54) CALIBRATION OF DIGITAL COLOR IMAGERY

(75) Inventors: Wade W. Brown, Blaine, MN (US); William R. Reynolds, Hancock, MI (US); John W. Hilgers, Houghton, MI (US)

(73) Assignee: Signature Research, Inc., Calumet, MI (US)

( * ) Notice: Subject to any disclaimer, the term of this patent is extended or adjusted under 35 U.S.C. 154(b) by 1362 days.

(21) Appl. No.: 10/213,293

(22) Filed: Aug. 6, 2002

(65) Prior Publication Data

US 2003/0052980 A1   Mar. 20, 2003

Related U.S. Application Data

(60) Provisional application No. 60/310,581, filed on Aug. 7, 2001.

(51) Int. Cl.
*H04N 9/73* (2006.01)
*H04N 5/222* (2006.01)
*G09G 5/02* (2006.01)

(52) U.S. Cl. .................... 348/224.1; 345/604; 348/370

(58) Field of Classification Search ............ 348/207.1, 348/207.2, 224.1, 223.1, 227.1, 370, 371; 382/276, 293; 345/604, 603
See application file for complete search history.

(56) References Cited

U.S. PATENT DOCUMENTS

| | | | |
|---|---|---|---|
| 5,481,380 A * | 1/1996 | Bestmann ................... 358/504 |
| 5,502,458 A | 3/1996 | Braudaway et al. |
| 5,668,596 A * | 9/1997 | Vogel ....................... 348/222.1 |
| 5,793,884 A * | 8/1998 | Farrell ......................... 382/167 |
| 5,805,213 A * | 9/1998 | Spaulding et al. ........ 348/222.1 |
| 5,809,213 A | 9/1998 | Bhattacharjya |
| 5,850,472 A | 12/1998 | Alston et al. |
| 5,864,834 A | 1/1999 | Arai |
| 5,956,015 A | 9/1999 | Hino |
| 5,956,044 A | 9/1999 | Giorgianni et al. |
| 6,038,339 A | 3/2000 | Hubel et al. |
| 6,115,492 A | 9/2000 | Meltzer et al. |
| 6,211,973 B1 | 4/2001 | Takemoto |
| 6,232,954 B1 | 5/2001 | Rozzi |
| 6,263,291 B1 | 7/2001 | Shakespeare et al. |
| 6,594,388 B1 * | 7/2003 | Gindele et al. ............. 382/167 |
| 6,856,354 B1 * | 2/2005 | Ohsawa ...................... 348/370 |
| 6,980,231 B1 * | 12/2005 | Ohsawa ...................... 348/188 |
| RE39,712 E * | 7/2007 | Vogel ....................... 348/222.1 |

OTHER PUBLICATIONS

W. H. Press, et al., "Numerical Recipes," 1986, pp. 289-294.

(Continued)

*Primary Examiner*—Lin Ye
*Assistant Examiner*—Nicholas G Giles
(74) *Attorney, Agent, or Firm*—Foley & Lardner LLP

(57) ABSTRACT

An apparatus and method for estimating the power spectral density of an unknown illuminant that does not require direct spectral measurements. The apparatus and method allows calibration of color images taken with commercially available digital cameras in arbitrary illumination. Besides an imaging system, a digital computer, a means for transferring image information from the imaging system to the digital computer, and software to carry out the method, the only additional equipment a photographer needs is a set of color standards.

52 Claims, 8 Drawing Sheets

OTHER PUBLICATIONS

Wyszecki and Stiles, "Color Science Concepts and Methods: Quantitative Data and Formulae" (book), John Wiley & Sons, New York, 2d Ed., 1982, pp. 130-174.

M. Corbalan, et al., "Color Measurement in Standard Cielab Coordinates Using a 3CCD Camera: Correction for the Influence of the Light Source," Optical Engineering, vol. 39, No. 6, 2000, p. 1470-1476.

W. W. Brown, et al., "Low Cost Colorimetry Using a Commercial Digital Camera," Proc. MMS CC&D, Aug. 2001

D. Sheffer, "Measurement and Processing of Signatures in the Visible Range Using a Calibrated Video Camera and the Camdet Software Package," Proc. SPIE, vol. 3062, 1997, pp. 243-253.

Slater and Healy, "Analyzing the Spectral Dimensionality of Outdoor Visible and Near-Infrared Illumination Functions," J. Opt. Soc. of America A, vol. 15, No. 11, Nov. 1998, pp. 2913-2920.

* cited by examiner

CALIBRATION OF DIGITAL COLOR IMAGERY

CROSS REFERENCE TO RELATED APPLICATION

This application claims the benefit of provisional application No. 60/310,581, filed Aug. 7, 2001, the disclosure of which is incorporated herein by reference.

FIELD OF THE INVENTION

This invention pertains generally to the field of processing of digital images and particularly to color calibration in digital images.

BACKGROUND OF THE INVENTION

Digital image data containing color information is produced by various imaging systems, including video cameras, digital still cameras, document scanners and so forth. Calibration of the color data obtained from the imaging system may be required to ensure that the image that is displayed on a display device or printed in hard copy conforms to what would be seen when a human observer views the original object. Such calibration is particularly important for high quality digital camera images.

Color calibrated digital cameras allow the professional photographer to be assured that his or her images are calibrated from the time of taking the picture to the final press run. Commercial programs currently exist for color calibration of computer monitors and hardcopy output devices, but there are limited choices for calibrating digital cameras for arbitrary imaging. As will be shown below, the red, green, and blue (RGB) values a digital camera outputs are a function of the surface reflectance of the object, the spectral response of the camera, and the illumination incident on the object being imaged. Ignoring the impact of differing illuminants has been shown to increase error in the calibration. See M. Corbalan, et al., "Color Measurement in Standard Cielab Coordinates Using a 3CCD Camera: Correction for the Influence of the Light Source," Optical Engineering, Vol. 39, No. 6, 2000, p. 1470-1476; W. W. Brown, et al., "Colorimetry Using a Standard Digital Camera," Proc. MMS CC&D, 2001.

There are a number of ways to account for the spectrum of illumination with which images were taken. If the equipment and time are available, the illumination can be measured directly, which is the most satisfactory method, although the equipment required to measure the illuminant typically costs over $20,000. If measured values of the illuminant are not available, an illuminant can be assumed and the calibration can be performed in the same fashion as if the illuminant were measured. However, the assumed illuminant commonly will not accurately correspond to the actual illuminant, leading to incorrect colors in the final output image.

The following provides a brief introduction to color science and the measurement of color to facilitate an understanding of the invention. The standard methods and formulae laid out by the Commission Internationale de l'Eclairage (CIE) will be followed and used herein.

The amounts of red, green, and blue needed to form a particular color are referred to as the tristimulus values, X, Y, and Z. The tristimulus values X, Y and Z of an object are calculated as follows:

$$X = K \int S(\lambda) R(\lambda) \bar{x}_{10}(\lambda) d\lambda$$
$$Y = K \int S(\lambda) R(\lambda) \bar{y}_{10}(\lambda) d\lambda \quad (1)$$
$$Z = K \int S(\lambda) R(\lambda) \bar{z}_{10}(\lambda) d\lambda$$

where $S(\lambda)$ is the relative spectral power density (SPD) of the illuminant and $R(\lambda)$ is the reflectance of the surface. The color matching functions corresponding to the 1964 CIE 10° standard observer, $x_{10}$, $y_{10}$, and $z_{10}$ are shown graphically in FIG. 1. A two-dimensional map is obtained by normalizing the magnitudes of the tristimulus values using a ratio of the X, Y, and Z values and the sum of the three values; these ratios are called the chromaticity values, x, y, and z, and are given by:

$$x = X/(X+Y+Z)$$
$$y = Y/(X+Y+Z) \quad (2)$$
$$z = Z/(X+Y+Z)$$

The chromaticity chart corresponding to the CIE 1964 10° standard observer is shown in FIG. 2. The data for both the matching functions and the chromaticity coordinates are from Wyszecki and Stiles, *Color Science Concepts and Methods: Quantitative Data and Formulae* (book), John Wiley & Sons, New York, 2d Ed., 1982. K is chosen to force the Y value of a white reference object to have a value of 100:

$$Y_{white} = K \int S(\lambda) R_{white}(\lambda) \bar{y}_{10}(\lambda) d\lambda = 100 \quad (3)$$

where $R_{white}(\lambda)$ is the reflectance of a standard white object, which would be unity for all $\lambda$. Solving Eq. (3) for K and substituting $R_{white}(\lambda) = 1$, K is found as:

$$K = 100 / \int S(\lambda) \bar{y}_{10}(\lambda) d\lambda \quad (4)$$

In practical application, only discrete values of the functions can be measured, so the integrals are approximated by summations and the resulting equations are:

$$X = K \Sigma R(\lambda) S(\lambda) \bar{x}(\lambda) \Delta \lambda$$
$$Y = K \Sigma R(\lambda) S(\lambda) \bar{y}(\lambda) \Delta \lambda \quad (5)$$
$$Z = K \Sigma R(\lambda) S(\lambda) \bar{z}(\lambda) \Delta \lambda$$

where $$K = 100 / \Sigma S(\lambda) \bar{y}(\lambda) \Delta \lambda \quad (6)$$

Once K is calculated, the X and Z values of the white point $X_n$, and $Z_n$, can be calculated with the following equations:

$$X_n = K \Sigma S(\lambda) \bar{x}(\lambda) \Delta \lambda$$
$$Z_n = K \Sigma S(\lambda) \bar{z}(\lambda) \Delta \lambda \quad (7)$$

To quantify color differences between standards and measured values, and to develop a standard cost function, a transformation needs to be made from XYZ coordinate space, as shown in Eq. (2), to a device independent color space. Using the CIE 1976 color space denoted by L*, a*, and b*, these transformations are:

$$L^* = 116 \sqrt[3]{\frac{Y}{Y_n}} - 16, \quad \frac{Y}{Y_n} > 0.008856 \quad (8)$$

-continued $$a^* = 500\left[\sqrt[3]{\frac{X}{X_n}} - \sqrt[3]{\frac{Y}{Y_n}}\right], \quad \frac{X}{X_n} > 0.008856$$

$$b^* = 200\left[\sqrt[3]{\frac{Y}{Y_n}} - \sqrt[3]{\frac{Z}{Z_n}}\right], \quad \frac{Z}{Z_n} > 0.008856$$

To quantify color differences the CIE 1976 color difference equation, denoted by $\Delta E^*_{ab}$, may be utilized as follows:

$$\Delta E^*_{ab} = [(\Delta L^*)^2 + (\Delta a^*)^2 + (\Delta b^*)^2]^{1/2} \quad (9)$$

where $\Delta L^*$ is the difference in $L^*$ values between the standard and measured values, and $\Delta a^*$ and $\Delta b^*$ are similarly differences between standard and measured values.

For purposes of calibrating a digital camera such as a CCD (charge coupled device) camera, three linear signals, $R_{camera}$, $G_{camera}$, and $B_{camera}$, can be obtained from the illuminant and the reflectance of the object. See, D. Sheffer, "Measurement and Processing of Signatures in the Visible Range Using a Calibrated Video Camera and the Camdet Software Package," Proc. SPIE, Vol. 3062, 1997, pp. 243-253. These signals are given by:

$$R_{camera} = K_r \int S(\lambda)R(\lambda)r(\lambda)d\lambda,$$

$$G_{camera} = K_g \int S(\lambda)R(\lambda)g(\lambda)d\lambda, \quad (10)$$

$$B_{camera} = K_b \int S(\lambda)R(\lambda)b(\lambda)d\lambda,$$

where $r(\lambda)$, $g(\lambda)$, and $b(\lambda)$ are the spectral response curves of the sensor in the camera and $K_r$, $K_g$, and $K_b$ are the gains set by the white balance process. The white balance process adjusts the K values until the output signals from the CCD, $R^*_{camera}$, $G^*_{camera}$, and $B^*_{camera}$, are equal when imaging a white reference object. The camera output signals are nonlinear and can be represented as:

$$R^*_{camera} = (R_{camera})^{\gamma r} + \beta_r,$$

$$G^*_{camera} = (G_{camera})^{\gamma g} + \beta_g, \quad (11)$$

$$B^*_{camera} = (B_{camera})^{\gamma b} + \beta_b,$$

where $\gamma r$, $\gamma g$, and $\gamma b$ are the gamma correction factors.

Since both XYZ and $R_{camera}$, $G_{camera}$, and $B_{camera}$ are linear transformations of $S(\lambda)$, we can write the following matrix equation:

$$\begin{pmatrix} X/X_n \\ Y/Y_n \\ Z/Z_n \end{pmatrix} = T \begin{pmatrix} R_{camera} \\ G_{camera} \\ B_{camera} \end{pmatrix} \quad (12)$$

where T is a transformation matrix. With measured values of $R_{camera}$, $G_{camera}$, and $B_{camera}$ and the corresponding XYZ coordinates for standard colors, determining T is simply a matter of finding the optimal solution to Eq. (12). The only obstacle left to overcome is that the camera's output signals $R^*_{camera}$, $G^*_{camera}$, and $B^*_{camera}$ and the outputs defined in Eq. (10) are nonlinear functions of one another, implying we need a transformation between the two sets of outputs prior to finding the transformation matrix T given in Eq. (12). A relationship similar to Eq. (11) can be written for $R^*_{camera}$, for example, in terms of $\rho_r$, the apparent average reflectance of the red portion of the spectrum for an arbitrary color standard. The equation is given by:

$$R^*_{camera} = (\alpha_r \rho_r)^{\gamma r} + \beta_r. \quad (13)$$

The parameters in Eq. (13), $\alpha_r$ and $\gamma_r$, can be determined by measuring $R^*_{camera}$ for a given $\rho_r$ for a number of standards and then fitting Eq. 13 to the results. The response the camera would have if it were linear is:

$$R_{camera} = \alpha_r \rho_r. \quad (14)$$

After the parameters are found we can solve Eq. (11) for $R_{camera}$ given an arbitrary $R^*_{camera}$. The fitting process is carried out in a similar manner for $G_{camera}$ and $B_{camera}$ for the green and blue channels.

Once the values of $R_{camera}$, $G_{camera}$ and $B_{camera}$ have been determined for the standard colors, we need to find the transformation matrix T given by Eq. (12). To find an optimal value of T we need a cost function. Recall that for every standard panel we have the $L^*a^*b^*$ coordinate, and from the trial values of $X/X_n$, $Y/Y_n$, and $Z/Z_n$ calculated using Eq. (12) we can find corresponding trial values $L^*a^*b^*$ from Eq. (9). With the trial values of the coordinates and the known $L^*a^*b^*$ values for each of the standard colors we use Eq. (9) to determine the error, $\Delta E^*_{ab}$, for each panel and the cost function, C, then is given by:

$$C = \sum_{i=1}^{N} \Delta E^*_{abi}, \quad (15)$$

where N is the total number of standard colors used.

In cases where the spectral responses of the camera are significantly different from the color-matching functions, the transformation can be expanded to include square and covariance terms of the RGB channels. The expanded transformation is:

$$\begin{pmatrix} X/X_n \\ Y/Y_n \\ Z/Z_n \end{pmatrix} = T_{full} \begin{pmatrix} R_{camera} \\ G_{camera} \\ B_{camera} \\ R^2_{camera} \\ G^2_{camera} \\ B^2_{camera} \\ R_{camera}G_{camera} \\ R_{camera}G_{camera} \\ G_{camera}B_{camera} \end{pmatrix} \quad (16)$$

The transformation matrix, $T_{full}$, is now a 3×9 matrix.

It is apparent from the foregoing discussion that it is necessary to estimate or measure the illuminant incident on the color standards to accurately calibrate a digital camera. The need to measure the illuminant comes from the fact that in Eq. (6), without an estimated illuminant, $S(\lambda)$, there are three times the number of spectral points in the illuminant unknowns and only three equations for each known color standard. With fewer equations than unknowns, the system is underdetermined. However, as noted above, measuring the illuminant, such as with a separate ambient illuminant sensor, raises the complexity and expense of obtaining calibrated images and is often cost prohibitive.

SUMMARY OF THE INVENTION

The present invention features a method and apparatus for accurately estimating the spectral power density of an unknown illuminant, which can lead directly to precise calibration of color digital imagery.

The method and apparatus for estimating the spectral power density of an unknown illuminant according to the invention includes an imaging system, such as a digital camera, which takes an image of a plurality of known color standards illuminated by an unknown illuminant. The color information contained in the resulting image is used to estimate the spectral power density of the unknown illuminant.

The method and apparatus according to the invention provides an accurate estimate of the spectral power density of an unknown illuminant at a substantially lower cost than methods found in the prior art, which use an expensive spectroradiometer to directly measure the spectral power density of the unknown illuminant.

Further objects, features, and advantages of the invention will be apparent from the following detailed description when taken in conjunction with the accompanying drawings.

DETAILED DESCRIPTION OF THE INVENTION

A linear model of an illuminant may be formed of fixed basis functions and weighting coefficients to be determined. Specifically, an arbitrary illuminant $L(\lambda)$ can be approximated by:

$$L(\lambda) = \sum_{i=1}^{n} \alpha_i l_i(\lambda), \quad (17)$$

where $\alpha_i$ are the coefficients and $l_i(\lambda)$ are the basis functions. A reduction in dimensionality of the illuminant occurs if the number of basis functions, n, required to approximate the illuminant is less than the number of data points in the original illuminant SPD. Slater and Healy, J. Opt. Soc. of America A, Vol. 15, No. 11, 1998, pp. 2913-2920, found that a basis set of seven vectors would estimate outdoor illumination under a wide variety of conditions with a high degree of accuracy. The seven basis functions adequate for estimating visible outdoor illuminants are given in Table 1. Using these basis functions with n=7 in Eq. (17), significantly reduces the dimensionality of the illuminant. The coefficients are not difficult to estimate in matrix form. Eq. (17) can be written as:

$$L(\lambda) = l\alpha, \quad (18)$$

with l being a matrix with columns that are equal to the basis functions and $\alpha$ is a vector whose elements are the coefficients to be determined. The solution that minimizes the sum-squared error is:

$$\alpha = (l^T l)^{-1} l^T L. \quad (19)$$

Figure 3:
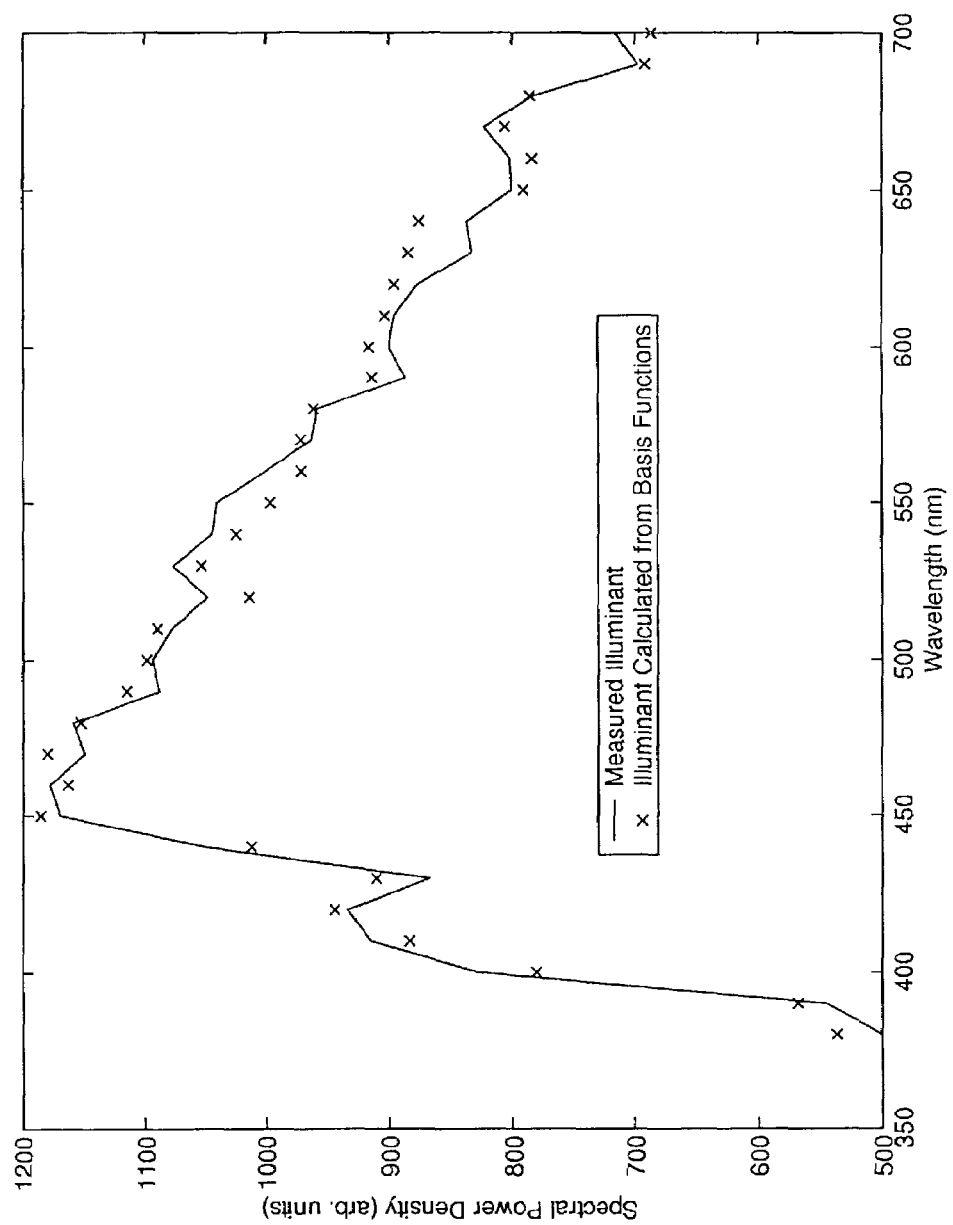
FIG. 3 is a graph illustrating $D_{65}$ illuminant measured and calculated values.

Table 2 shows the seven coefficients for several standard CIE illuminants ($D_{65}$, $D_{50}$, m, $m_2$, $m_3$, $m_4$). The coefficients were calculated using Eq. (19). FIG. 3 shows the spectrum of the $D_{65}$ illuminant as given in Wyszecki and Stiles, *Color Science Concepts and Methods, Quantitative Data and Formulae*, John Wiley & Sons, New York, 2d ed., 1992, along with values of the illuminant calculated using the seven basis functions of Table 1.

TABLE 1

| | Basis Functions for General Outdoor Illumination | | | | | | |
|---|---|---|---|---|---|---|---|
| $\lambda(\mu M)$ | $I_1(\lambda)$ | $I_2(\lambda)$ | $I_3(\lambda)$ | $I_4(\lambda)$ | $I_5(\lambda)$ | $I_6(\lambda)$ | $I_7(\lambda)$ |
| 0.3300 | 0.0532 | 0.0052 | 0.0016 | −0.1830 | 0.0430 | −0.1055 | −0.5521 |
| 0.3400 | 0.0937 | −0.8586 | −0.1109 | 0.0257 | 0.0015 | 0.0148 | 0.0390 |
| 0.3500 | 0.0891 | −0.4957 | 0.1223 | −0.0290 | −0.0026 | −0.0259 | −0.0674 |
| 0.3600 | 0.0866 | −0.0236 | 0.9816 | 0.0435 | 0.0013 | 0.0079 | 0.0208 |
| 0.3700 | 0.0831 | 0.0080 | 0.0203 | −0.2123 | −0.0179 | −0.1339 | −0.3438 |
| 0.3800 | 0.0813 | 0.0086 | −0.0005 | −0.1986 | −0.0272 | −0.1213 | −0.2579 |
| 0.3900 | 0.0840 | 0.0091 | −0.0012 | −0.1889 | −0.0352 | −0.1118 | −0.1827 |
| 0.4000 | 0.1134 | 0.0126 | −0.0024 | −0.2330 | −0.0538 | −0.1331 | −0.1473 |
| 0.4100 | 0.1315 | 0.0148 | −0.0036 | −0.2470 | −0.0649 | −0.1361 | −0.0833 |
| 0.4200 | 0.1425 | 0.0163 | −0.0048 | −0.2415 | −0.0697 | −0.1269 | −0.0068 |
| 0.4300 | 0.1388 | 0.0161 | −0.0056 | −0.2112 | −0.0642 | −0.1045 | 0.0562 |
| 0.4400 | 0.1539 | 0.0182 | −0.0071 | −0.2067 | −0.0638 | −0.0934 | 0.1190 |
| 0.4500 | 0.1819 | 0.0218 | −0.0095 | −0.2144 | −0.0641 | −0.0857 | 0.1861 |
| 0.4600 | 0.1853 | 0.0224 | −0.0106 | −0.1892 | −0.0512 | −0.0606 | 0.2178 |
| 0.4700 | 0.1864 | 0.0229 | −0.0117 | −0.1612 | −0.0346 | −0.0352 | 0.2339 |

TABLE 1-continued

Basis Functions for General Outdoor Illumination

| λ(μM) | I₁(λ) | I₂(λ) | I₃(λ) | I₄(λ) | I₅(λ) | I₆(λ) | I₇(λ) |
|---|---|---|---|---|---|---|---|
| 0.4800 | 0.1884 | 0.0233 | −0.0127 | −0.1367 | −0.0165 | −0.0039 | 0.2311 |
| 0.4900 | 0.1855 | 0.0232 | −0.0133 | −0.1081 | 0.0042 | 0.0230 | 0.2140 |
| 0.5000 | 0.1864 | 0.0235 | −0.0141 | −0.0858 | 0.0254 | 0.0584 | 0.1831 |
| 0.5100 | 0.1882 | 0.0239 | −0.0150 | −0.0644 | 0.0480 | 0.0928 | 0.1437 |
| 0.5200 | 0.1769 | 0.0227 | −0.0147 | −0.0392 | 0.0679 | 0.1172 | 0.0901 |
| 0.5300 | 0.1877 | 0.0242 | −0.0161 | −0.0246 | 0.0954 | 0.1712 | 0.0282 |
| 0.5400 | 0.1893 | 0.0245 | −0.0168 | −0.0055 | 0.1208 | 0.2062 | −0.0339 |
| 0.5500 | 0.1884 | 0.0245 | −0.0173 | 0.0123 | 0.1427 | 0.2304 | −0.0887 |
| 0.5600 | 0.1860 | 0.0243 | −0.0175 | 0.0257 | 0.1400 | 0.2291 | −0.1013 |
| 0.5700 | 0.1821 | 0.0240 | −0.0177 | 0.0461 | −0.0362 | 0.2755 | −0.1421 |
| 0.5800 | 0.1858 | 0.0246 | −0.0185 | 0.0610 | 0.0191 | 0.2260 | −0.1311 |
| 0.5900 | 0.1663 | 0.0224 | −0.0177 | 0.0928 | −0.3606 | 0.3014 | −0.1338 |
| 0.6000 | 0.1762 | 0.0237 | −0.0188 | 0.0967 | −0.1353 | 0.2176 | −0.1193 |
| 0.6100 | 0.1898 | 0.0255 | −0.0203 | 0.1037 | 0.2057 | 0.0724 | −0.0702 |
| 0.6200 | 0.1908 | 0.0259 | −0.0212 | 0.1281 | 0.2201 | 0.0013 | −0.0459 |
| 0.6300 | 0.1842 | 0.0253 | −0.0213 | 0.1505 | 0.0640 | −0.0058 | −0.0547 |
| 0.6400 | 0.1870 | 0.0259 | −0.0224 | 0.1760 | 0.0768 | −0.0936 | −0.0631 |
| 0.6500 | 0.1675 | 0.0235 | −0.0213 | 0.2000 | −0.2801 | −0.0493 | −0.0503 |
| 0.6600 | 0.1772 | 0.0249 | −0.0227 | 0.2125 | 0.0099 | −0.1980 | −0.0389 |
| 0.6700 | 0.1932 | 0.0272 | −0.0250 | 0.2342 | 0.3032 | −0.3494 | −0.0107 |
| 0.6800 | 0.1880 | 0.0267 | −0.0249 | 0.2463 | 0.2726 | −0.3813 | 0.0056 |
| 0.6900 | 0.1494 | 0.0216 | −0.0208 | 0.2332 | −0.2863 | −0.1531 | 0.1226 |
| 0.7000 | 0.1487 | 0.0217 | −0.0215 | 0.2639 | −0.5648 | −0.2076 | −0.0590 |

Each choice of the weighting coefficients ($\alpha_1$, $\alpha_2$, $\alpha_3$, ..., $\alpha_7$) will yield a unique illuminant for which the camera can be calibrated from Eq. (15). Each choice of illuminant will result in a different minimum value of the cost function given by Eq. (15). The illuminant that yields the smallest minimum cost functions is the best estimate of the illuminant incident on the color chart. Once the illuminant is estimated, the calibration process can proceed as detailed above.

TABLE 2

Coefficients for Standard Illuminants

| Illum. | $\alpha_1$ | $\alpha_2$ | $\alpha_3$ | $\alpha_4$ | $\alpha_5$ | $\alpha_6$ | $\alpha_7$ |
|---|---|---|---|---|---|---|---|
| $D_{50}$ | −2.63 × 10⁴ | 1.81 × 10⁵ | −8.90 × 10⁴ | −4.11 × 10³ | −1.18 × 10² | 1.52 × 10² | −2.65 × 10¹ |
| $D_{65}$ | −3.44 × 10⁴ | 2.56 × 10⁵ | −7.33 × 10⁴ | −5.43 × 10³ | −1.90 × 10² | 7.16 × 10¹ | −6.67 × 10¹ |
| $m_1$ | −2.38 × 10⁴ | 2.12 × 10⁵ | −1.73 × 10⁴ | −2.51 × 10³ | −1.23 × 10² | 1.30 × 10² | −1.88 × 10² |
| $m_2$ | −1.56 × 10⁴ | 1.08 × 10⁵ | −7.47 × 10⁴ | −2.90 × 10³ | −8.32 × 10¹ | 1.67 × 10² | −1.10 × 10² |
| $m_3$ | −1.08 × 10⁴ | 4.51 × 10⁴ | −1.11 × 10⁵ | −3.06 × 10³ | −5.68 × 10¹ | 1.54 × 10² | −9.86 × 10¹ |
| $m_4$ | −4.86 × 10³ | −9.19 × 10³ | −1.23 × 10⁵ | −2.59 × 10³ | −3.23 × 10¹ | 1.02 × 10² | −1.19 × 10² |

Figure 4:
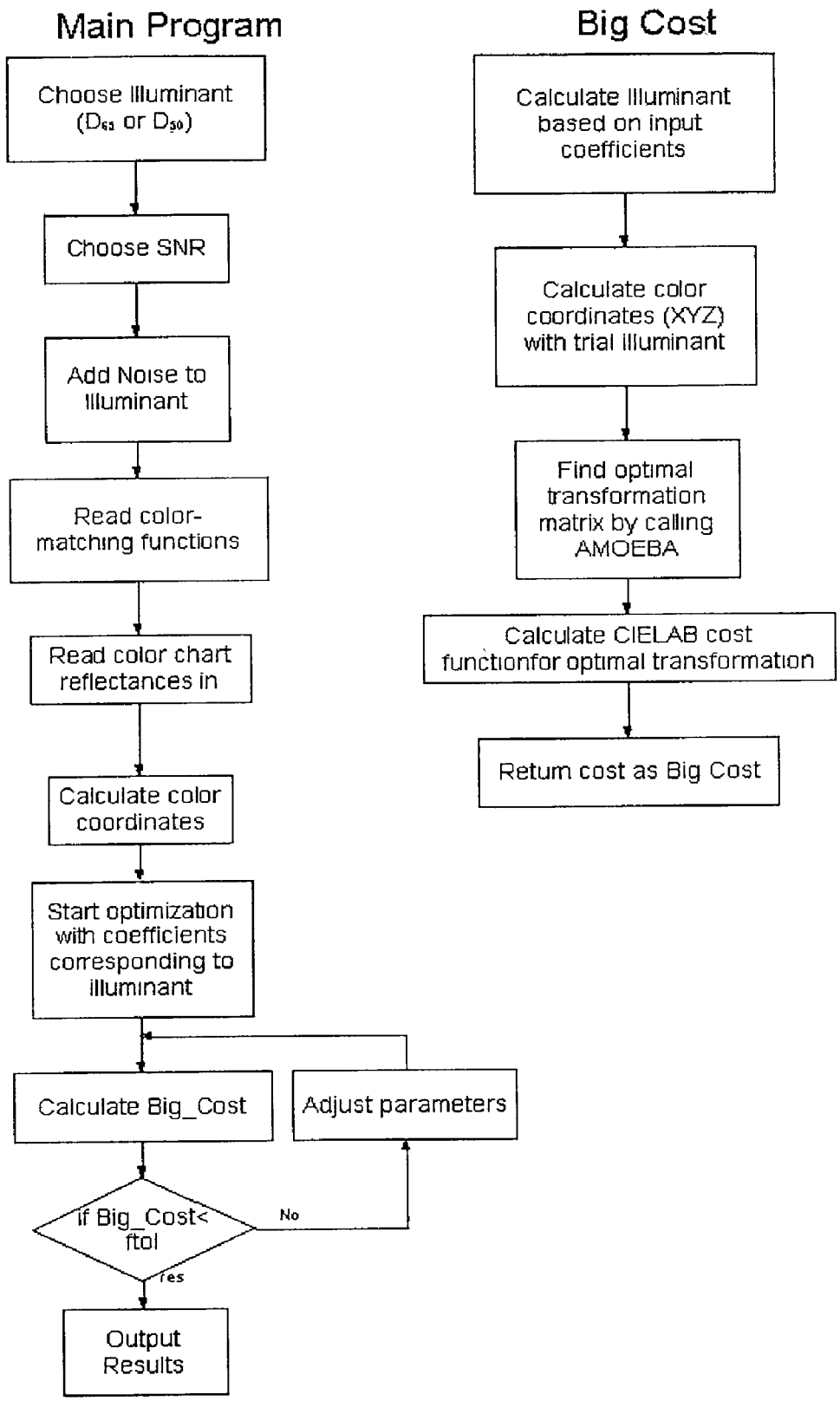
FIG. 4 is a flow chart illustrating operations of the computer software for carrying out the optimization method in accordance with the invention.

The process for estimating the illuminant is an optimization inside of an optimization. The inner optimization determines a cost for a given illuminant, as discussed above, implying for every choice of coefficients, ($\alpha_1$, $\alpha_2$, ..., $\alpha_7$), there will be a cost, C, given by:

$$C = \sum_{i=1}^{N} \Delta E^*_{ab}, \quad (20)$$

where N is the number of standards used. For every value of the illuminant we have a different value of C. The first optimization finds the optimal transformation matrix, $T_{full}$, as shown in Eq. (16). The outer optimization adjusts the coefficients defining the estimated illuminant until a minimum in the total cost is achieved. The computational intensity of this process is largely due to the fact that $T_{full}$ has 27 unknown values and the outer optimization has to optimize the 7 coefficients that define the illuminant. FIG. 4 shows a flow chart of the optimization process. Both optimization routines may utilize use code adapted from Numerical Recipe's AMOEBA routine, which uses a downhill Simplex method. See, W. H. Press, et al., *Numerical Recipes*, 1996. The Simplex method, although slow, is robust for the problem at hand. Although the Simplex method is used in a preferred embodiment according to the invention, other search methods to obtain an optimal solution could be used, including but not limited to Simpson's, Powell, Levenberg-Marquardt, Davidon, or Newton-like methods.

Figure 7:
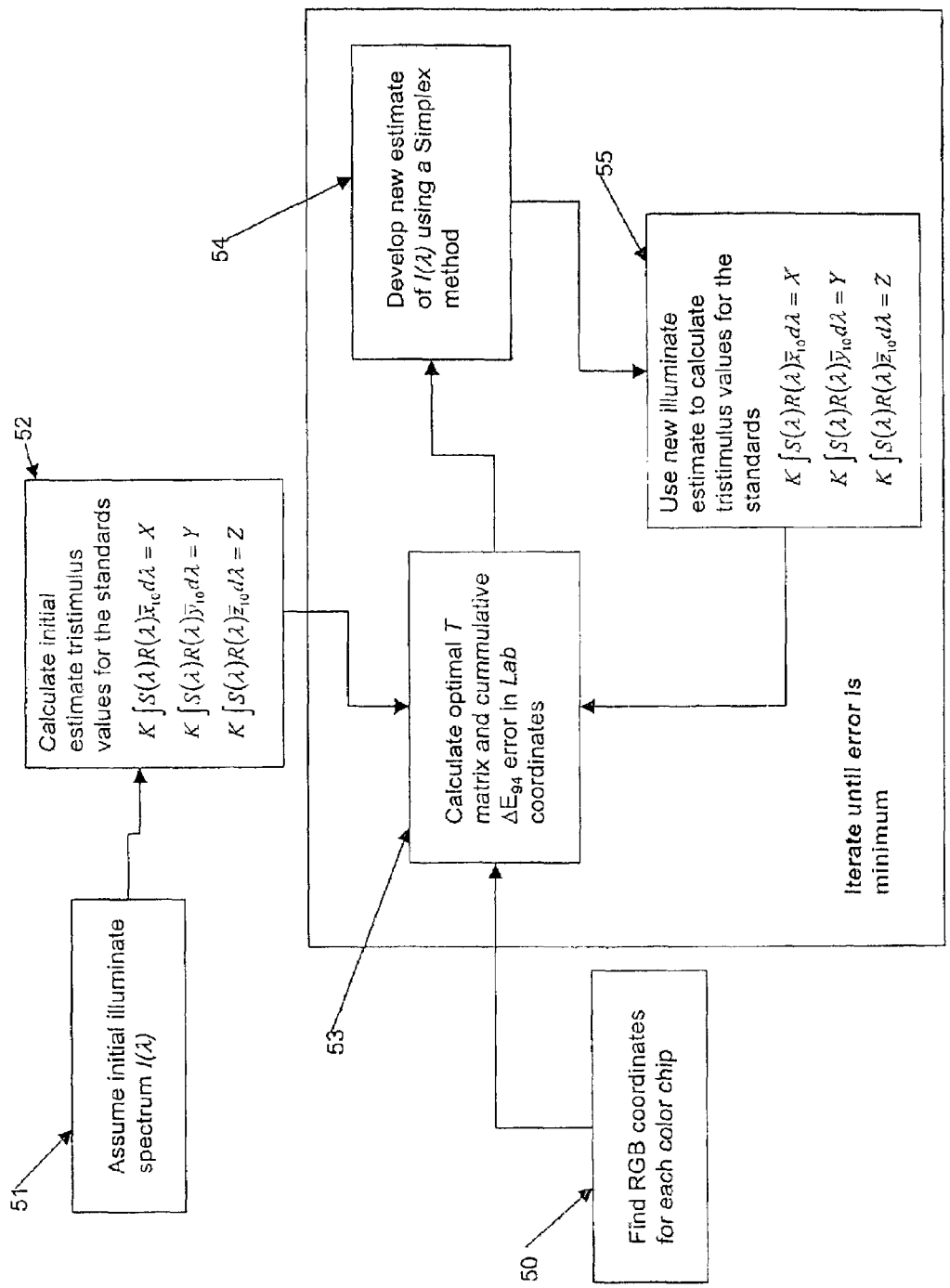
FIG. 7 is a flow chart illustrating the method for calculation of the illuminant spectrum in accordance with the invention.

With reference to the flow chart of FIG. 7, the determination of the illuminant spectrum may be summarized as follows:

1. Using N color standards find the raw RGB value for each standard (block 50).

2. Assume initial illuminant spectrum (block 51).

3. Calculate initial tristimulus value for the standards based on assumed illuminant (block 52)

4. Find the optimal solution matrix T in the color Lab space given the illuminant (block 53), where $$T_{full} \begin{bmatrix} R \\ G \\ B \\ R^2 \\ G^2 \\ B^2 \\ RG \\ RB \\ GB \end{bmatrix} = \begin{bmatrix} X/X_n \\ Y/Y_n \\ Z/Z_n \end{bmatrix}$$

5. Derive a new estimate of the illuminant L(λ) using optimization techniques such as Simplex methods (block 54).

6. Use the new illuminant to calculate tristimulus values (block 55) and repeat step 4 (at block 53).

7. Find the illuminant spectrum which minimizes the Lab cost function (block 54) and save that spectrum for use in calibration of the image as discussed above. This process may be iterated until the cumulative error in Lab coordinates is less than a selected value.

Figure 8:
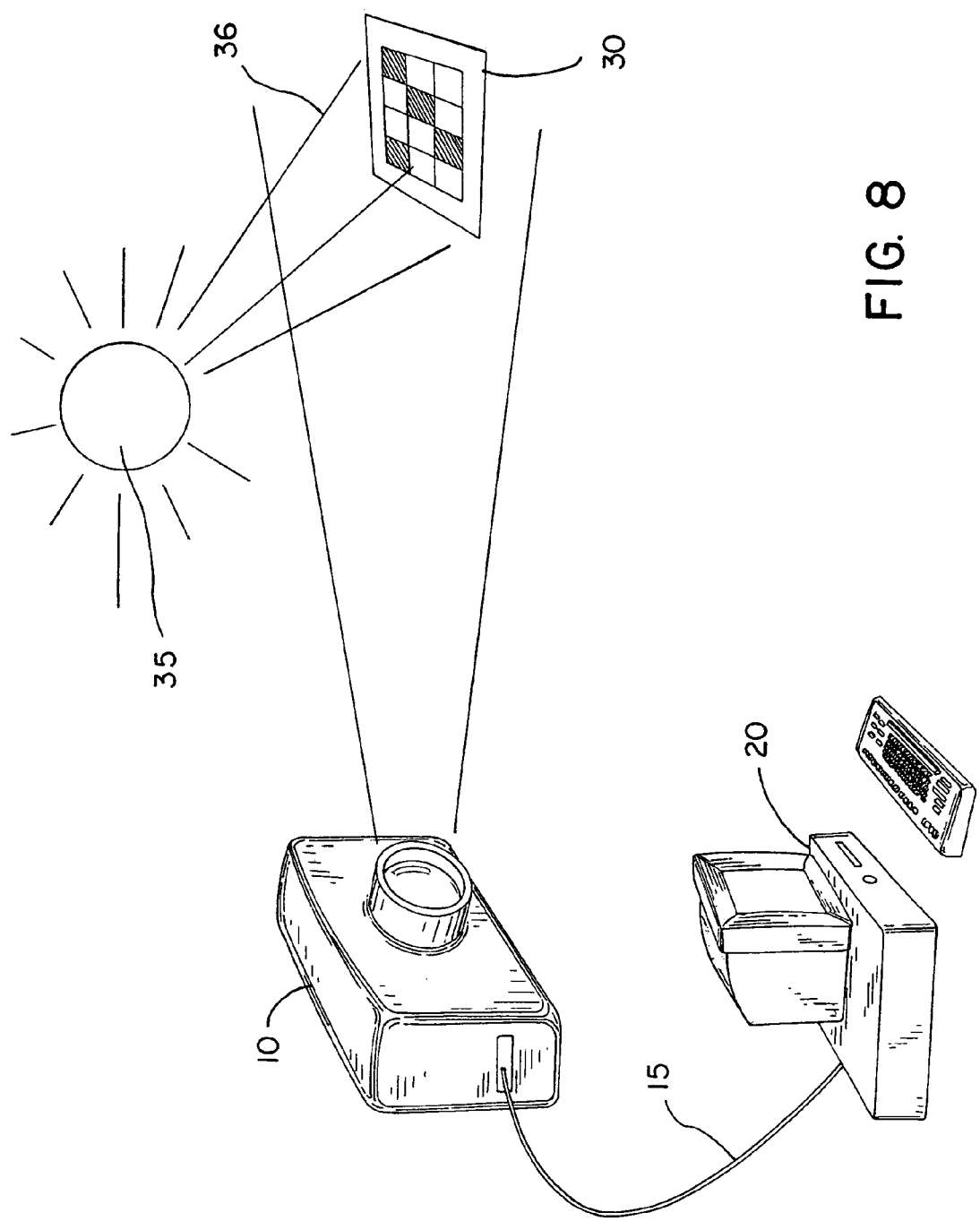
FIG. 8 is a block diagram for an apparatus in accordance with the invention.

FIG. 8 shows a preferred embodiment of an apparatus according to the invention for estimating the spectral power density of an unknown illuminant. The apparatus includes a camera, shown generally at 10. In a preferred embodiment, the camera may be one of any number of digital cameras which are widely available, such as the Nikon D1 or Kodak DCS-420 digital cameras. The camera may also be a film camera of the type which is well known in the art.

The apparatus further includes a plurality of color standards, shown generally at 30. The plurality of color standards may be a commercially available chart of color standards, such as the Macbeth ColorChecker product available from GretagMacbeth 617 Little Britain Road New Windsor, N.Y. 12553-6148. Alternatively, the color standards may be specially made to emphasize particular regions of the color spectrum if greater accuracy in those specific regions of the color spectrum is necessary or desirable. As shown in FIG. 8, the plurality of color standards 30 is illuminated with an illuminant 36 of unknown spectral power density. The illumination may come from a natural source of illumination, such as the sun 35, or the illumination may come from a source of artificial light.

The apparatus includes a digital computer, shown generally at 20. The digital computer can be one of any number of commercially available digital computers, of the types which are well known in the art and widely available, such as the IBM ThinkPad laptop computer model X20. Although the embodiment shown in FIG. 8 contemplates the use of a separate standalone digital computer in an apparatus according to the invention, the digital computer could be built in to the digital camera 10.

The apparatus includes an image transfer means for transferring image information, indicated generally at 15, between the camera 10 and the digital computer 20. If the camera 10 is a digital camera, the image information, such as color output signal or tristimulus values, may be transferred via a cable (such as a Universal Serial Bus cable), via some form of optical or magnetic media (such as a compact disk, flash memory card, or floppy disk), or via a wireless method (such as infrared or radio frequency). If the camera is a film camera, the means for transferring image information might be a photographic print or negative of the image coupled with a scanner device which can digitally scan the photographic print or negative to produce digital image information which can be transferred into the digital computer 20.

The camera 10 of FIG. 8 is operated to take an image of the plurality of color standards 30 illuminated with an illuminant 36 having an unknown illuminant spectrum, and the image information is transferred via the image transfer means 15 to the digital computer 20. The digital computer is programmed to receive the image information, and to process the image information to estimate the power spectral density of the unknown illuminant spectrum, consistent with the preceding discussion.

Figure 1:
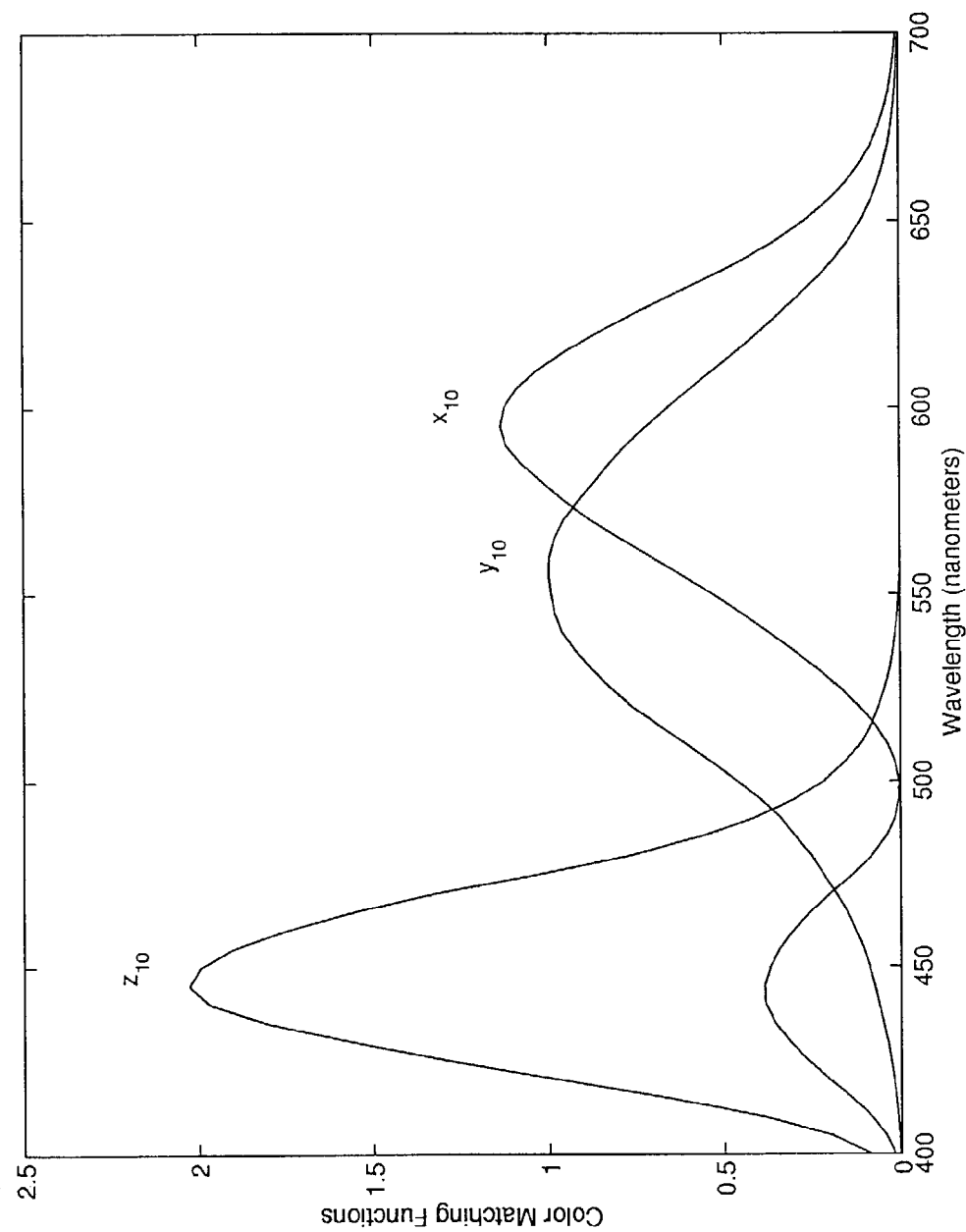
FIG. 1 are graphs of color matching functions for 10° standard observer (CIE 1964).
Figure 2:
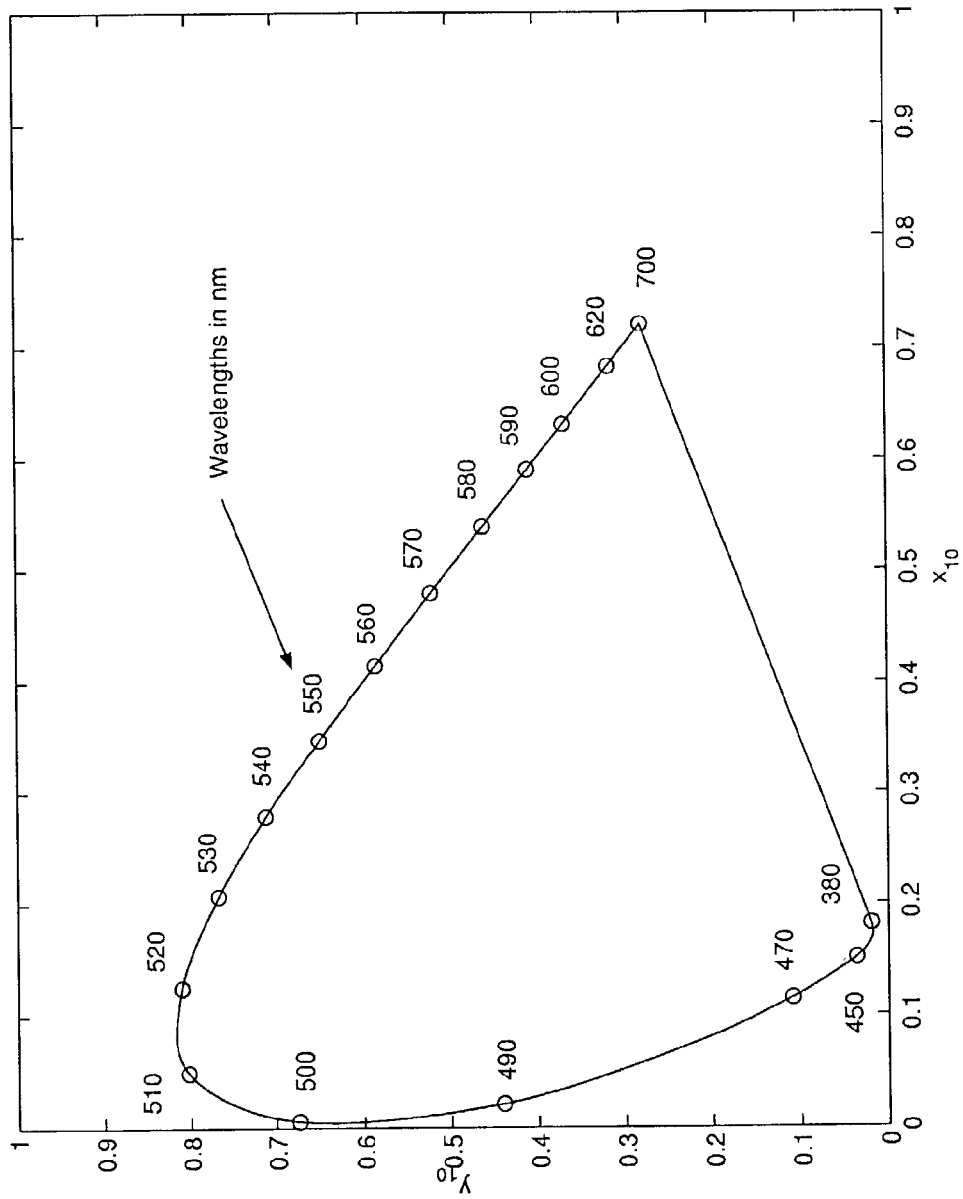
FIG. 2 is a graph showing the CIE 1964 10° standard observer chromaticity chart.

The following example discusses simulations that illustrate the calibration method of the invention for arbitrary illuminants. First we will discuss simulating the data, then the optimization techniques used to estimate the illuminant. The choice of illuminant for the simulation example was restricted to standard CIE daylight values. After reading in an illuminant, the color coordinates for the color chart used for the simulation can be determined following Eq. (6). The reflectance curves for the MacBeth color checker were used for the simulation, and the color matching functions were those shown in FIG. 1.

Many digital cameras 10 have a gamma correction applied to the RGB values which we denote as R', G', and B'. This gamma correction must be removed to obtain the raw RGB response of that camera. Other digital cameras 10, such as the Nikon D1, have a raw format in which the gamma correction is not applied to the pixel values, and for these digital cameras there is no need to remove a gamma correction.

To estimate the camera response (RGB) for a given set of color coordinates we calculate the pseudo inverse of $T_{full}$ given in Eq. (16), where $T_{full}$ has been determined from measured data. It is understood that the transformation matrix for a given camera is not constant, but will vary given the conditions under which the photo was taken. To make a realistic simulation, we also added noise to the RGB values, corresponding to measurement noise of the camera. Once again, zero-mean random Gaussian noise vector is added to each of the RGB values, with the standard deviation given by $$\sigma_{cam} = R/SNR_{cam}, \quad (21)$$

with similar equations used for the blue and green channels.

After generating simulated data, the simulation estimates the illuminant incident on the color standards. The calibration process for the camera is then undertaken with the illuminant estimated, values of L*, a*, and b* are found based on the estimated illuminant, and these values are then compared with the values calculated using the original simulated illuminant. The purpose of the simulation is to demonstrate the ability of the calibration method of the invention to achieve sound results for illuminants that are close to standard daylight. In addition, adding noise to the RGB values shows how camera noise affects the overall accuracy of the results.

Figure 5:
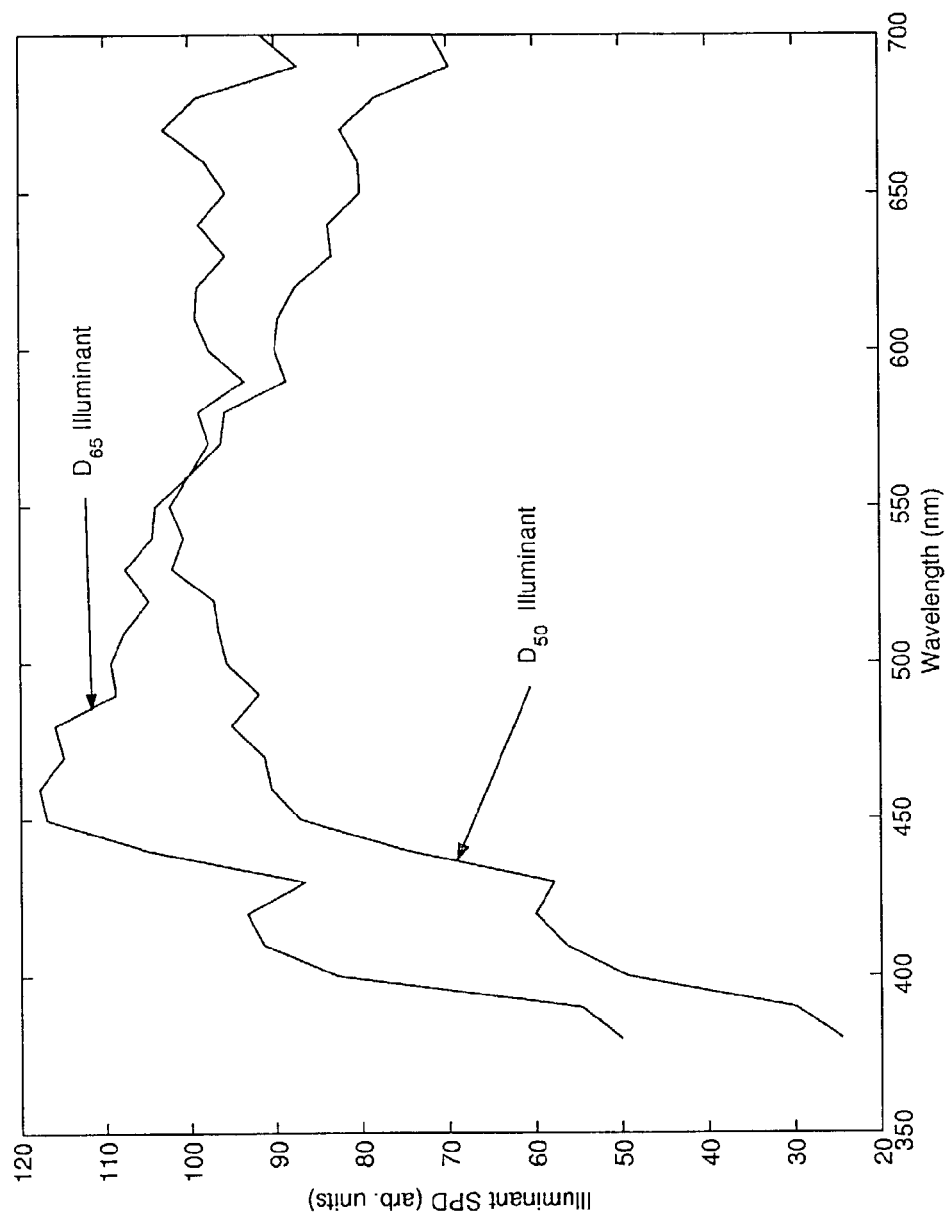
FIG. 5 are graphs showing both the $D_{50}$ and $D_{65}$ illuminant spectra for comparison purposes.
Figure 6:
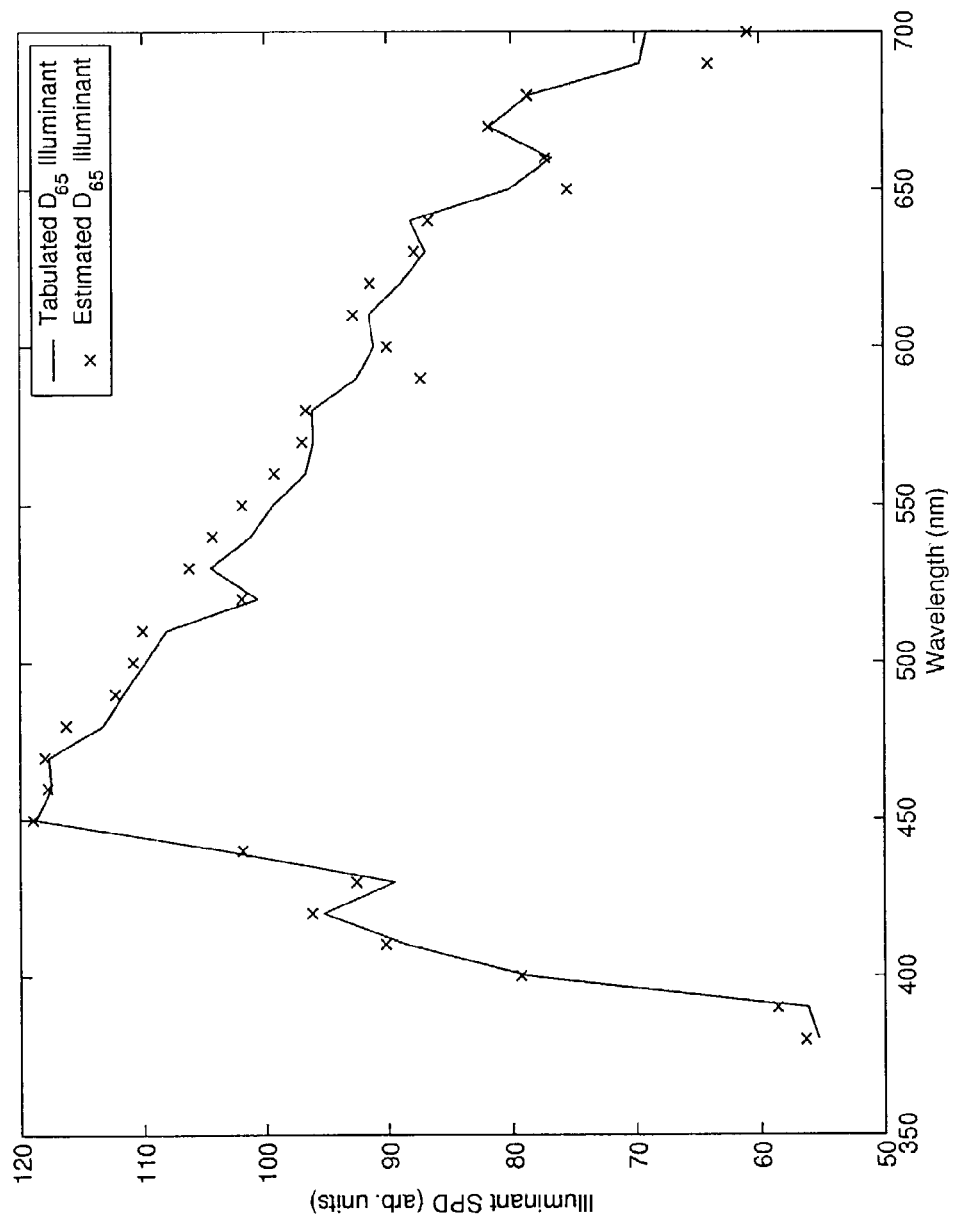
FIG. 6 is a graph showing $D_{65}$ illuminant tabulated and estimated values.

FIG. 6 shows tabulated values of the CIE standard illuminant $D_{65}$ along with the estimated illuminant obtained from the optimization methods discussed above. The starting values for the coefficients, $\alpha_1$'s, were the coefficients for the $D_{50}$ illuminant. The spectrum of $D_{50}$ is distinctly different from that of $D_{65}$, and yet the estimation technique of the invention is found to be quite robust in terms of the starting values of the coefficients. FIG. 5 shows both the CIE standard illuminants $D_{50}$ and $D_{65}$, and illustrates that the spectral nature of these illuminants is distinct. As can be seen in FIG. 6, the estimated illuminant is not as accurate as one could obtain by measuring, but yields detailed spectral information based only on the measured RGB values and the reflectance curves of the color standards. Estimating the illuminant by this method is only a computational burden that can be done after the imaging session.

Table 3 shows the results of a limited number of simulations to help examine the statistical soundness of the calibration method. The results detail which illuminant was used to generate the color standards, the SNR (signal-to-noise ratio) level for the camera's RGB values, the average of the color difference between the best fit and the generated standards, and the standard deviation for the color difference results. The starting values of the coefficients in the case of illuminant $D_{65}$ were the coefficients for $D_{50}$, and for illuminant $D_{50}$ so the starting point was $D_{65}$. As a rule of thumb, perceptible color difference can be discerned by the observer when $\Delta E^*_{ab}$ is greater than 3; perusal of the data will show that not only is the average difference less than the perceptibility limit but it is also more than 15 standard deviations away from the limit.

TABLE 3

Results of Color Difference Estimates

| Illuminant | Camera SNR | Num. of Runs | Num. of Colors | Ave. $\Delta E^*_{ab}$ | Std. Dev. $\Delta E^*_{ab}$ |
|---|---|---|---|---|---|
| $D_{65}$ | 50 | 50 | 24 | .248 | .174 |
| $D_{65}$ | 100 | 50 | 24 | .252 | .194 |
| $D_{50}$ | 50 | 50 | 24 | .229 | .188 |
| $D_{50}$ | 100 | 50 | 24 | .243 | .191 |

It is possible to estimate the illuminant in a manner similar to that discussed above but by finding the illuminant directly instead of fitting for the coefficients in the linear expansion. The number of parameters to fit in the optimization process for the illuminant jumps from seven linear coefficients to the total number of points in the desired illuminant. The number of data points in the illuminant will be the same as the number of color standards. For example, using the MacBeth Colorchecker, which has 24 colors, there are 24 data points in the estimated illuminant. The spectral resolution obtained by using the MacBeth Colorchecker would equal (700 nm–380 nm)/23, which is approximately 14 nm. Tabulated values for one of the CIE standard daylight illuminants, such as $D_{65}$, may be used as the initial values for the optimization process. To increase the resolution in the estimated illuminant, a larger number of color standards could be used. In addition to the MacBeth Colorchecker, any other appropriate color standard may be utilized.

It is understood that the invention is not confined to the embodiments set forth herein as illustrative, but embraces all such forms thereof as come within the scope of the following claims.

What is claimed is:

1. A method of estimating an unknown illuminant in an image produce by a digital imaging system comprising:
   (a) taking an image of color standards illuminated by an unknown illuminant with an imaging system and finding red-green-blue values for the colors standards;
   (b) providing an initial assumed illuminant value and calculating initial assumed tristimulus values for the color standards based on the initial assumed illuminant value;
   (c) determining an optimal transformation matrix based on the initial assumed trisimulus values for the color standards and determining a cumulative error;
   (d) developing a new estimated illuminant value using an optimization technique;
   (e) determining new tristimulus values for the color standards using the new estimated illuminant value; and
   (f) determining a new optimal transformation matrix given the new tristimulus values for the standard and determining a new cumulative error to determine an estimate of the unknown illuminant.

2. The method of claim 1 wherein the process of steps (d)-(f) is repeated in iteration until the new cumulative error is less than a selected value.

3. The method of claim 1 wherein the optimization technique for developing a new estimated illuminant is carried out using a Simplex method.

4. A method of estimating an unknown illuminant comprising:
   (a) providing one or more color standards illuminated with the unknown illuminant;
   (b) providing an imaging system;
   (c) taking an image with the imaging system of the one or more color standards illuminated with the unknown illuminant to obtain plurality of color output signals;
   (d) providing an estimate of the unknown illuminant;
   (e) calculating a plurality of estimated color output signals based on the estimate of the unknown illuminant;
   (f) calculating a color difference value using at least one of the plurality of color output signals and one of the plurality of estimated color output signals; and
   (g) calculating a second estimate of the unknown illuminant using the estimate of the unknown illuminant and the color difference value.

5. The method of claim 4 further comprising calculating one or more measured tristimulus values from the imaging system from the plurality of color output signals from the imaging system.

6. The method of claim 4 wherein the second estimate of the unknown iluminant is used to calibrate the imaging system.

7. The method of claim 4 wherein the imaging system is a digital imaging system.

8. The method of claim 4 wherein the imaging system is a film camera and further wherein the method further comprises scanning the image to obtain the plurality of color output signals.

9. The method of claim 4 wherein calculating the second estimate of the unknown illuminant is performed using an optimization.

10. The method of claim 9 wherein the optimization technique is carried out using a Simplex method.

11. The method of claim 4 wherein the process of steps (e)-(g) is repeated in iteration until the color difference value is less than a threshold color difference value.

12. The method of claim 11 further comprising calculating one or more measured tristimulus values from the imaging system from the plurality of color output signals from the imaging system.

13. The method of claim 11 wherein the second estimate of the unknown iluminant is used to calibrate the imaging system.

14. The method of claim 11 wherein the imaging system is a digital imaging system.

15. The method of claim 11 wherein the imaging sytem is a film camera and further wherein the method further comprises scanning the image to obtain the plurality of color output signals.

16. The method of clam 11 wherein calculating the second estimate of is performed using an optimization technique.

17. The method of claim 16 wherein the optimization technique is carried out using a Simplex method.

18. A method of estimating an unknown illuminant comprising:
(a) providing a plurality of color standards illuminated with the unknown illumiant;
(b) providing an imaging system;
(c) taking an image with the imaging system of the plurality of color standard illuminant with the unknown illuminant to obtain a plurality of measured color output signals;
(d) providing one or more potential illuminant values;
(e) for at least one potential illuminant value of the one or more potential illuminant values, calculating a plurality of potential color output signals based on the at least one potential illuminant value;
(f) calculating a color difference value between the plurality of potential color output signals and the plurality of measured color signals; and
(g) choosing a potential illuminant value of the at least one potential illuminant value as the estimate of the unknown illuminant using the color difference value.

19. The method of claim 18 wherein (e) is performed before (c).

20. The method of claim 18 wherein the plurality of potential color output signals is stored in a lookup table.

21. The method of cliam 18 wherein the plurality of potential color output signals is stored in a lookup table and indexed to facilitate rapid identification of the potential illuminant value which results in the smallest color difference value.

22. A method of estimating an unknown illuminant comprising:
(a) providing a plurality of color standards illumianated with the unknown illuminant;
(b) providing an imaging system;
(c) taking an image with the imaging system of the plurality of color standards illuminated with the unknown illuminant to obtain a plurality of measured tristimulus values;
(d) providing an initial estimate of the unknown illuminant as a current estimate of the unknown illuminant;
(e) calculating a plurality of estimated tristimulus values based on the current estimate of the unknown illuminant;
(f) calculating a color difference value using at least one of the plurality of measured tristimulus values and at least one of the plurality of estimate tristimulus values; and
(g) calculating a new estimate of the unknown illuminant using the current estmate of the unknown illuminant and the color difference value.

23. The method of claim 22 wherein the new estimated illuminant is used to calibrate the imaging system.

24. The method of claim 22 wherein the imaging system is a digital imaging system.

25. The method of claim 22 wherein the imaging system is a film camera and further wherein the method further comprises scanning the image to obtain the plurality of measured tristimulus values.

26. The method of claim 22 wherein calculating the estimate of the unknown illuminant further comprises providing an optimization technique, and using the optimization technique in calculating the new estimate of the unknown illuminant.

27. The method of claim 26 wherein the optimization technique is carried out using a Simplex method.

28. The method of claim 22 wherein steps (e)-(g) are repeated in iteration until the color difference value is less than a thershold color difference value.

29. The method of claim 28 wherein the new estimated illuminant is used to calibrate the imaging system.

30. The method of claim 28 wherein the imaging system is a digital imaging system.

31. The method of claim 28 wherein the imaging system is a film camera and further wherein the method further comprises scanning the image to obtain the plurality of measured tristimulus values.

32. The method of claim 28 wherein calculating the new estimate of the unknown illuminant further comprises providing an optimization technique, and using the optimization technique in calculating the new estimate of the unknown illuminant.

33. The method of claim 32 wherein the optimization technique is carried out using a Simplex method.

34. A method of estimating an unknown illuminant comprising:
(a) providing a plurality of color standards illuminated with the unknown illuminant;
(b) providing an imaging system;
(c) taking an image with the imaging system of the plurality of color standards illuminated with the unknown illuminant to obtain a plurality of measured tristimulus values;
(d) providing one or more potential illuminant values;
(e) for at least one potential illuminant value of the one or more potential illuminant vLUES, calculating a plurality of potential tristimulus values based on the at least one potential illuminant value;
(f) calculating a color difference value between the plurality of potential tristimulus values and the plurality of measured tristimulus values; and
(g) choosing a potential illuminant value of the at least one potential illuminant value as the estimate of the unknown illuminant using the color difference value.

35. The method of claim 34 wherein steps (e)-(g) are repeated in iteration until the color difference value is less than a threshold color difference value.

36. The method of claim 34 wherein (e) is performed before (c).

37. The method of claim 34 wherein the plurality of potential tristimulus values is stored in a lookup table.

38. The method of claim 34 wherein the plurality of potential tristimulus values is stored in a lookup table and indexed to facilitate rapid identification of the potential illuminant value which results in the smallest color difference value.

39. A system for estimating an unknown illuminant comprising:
an imaging system;
a plurality of color standards illuminanted by the unknown illuminant;
a means for transferring image information from the imaging system to a digital computer; and the digital computer programmed to:
(a) receive image information of the plurality of color standards illuminated by the unknown illuminant to obtain one or more measured color output signals;
(b) provide an estimate of the unknown illuminant;
(c) calculate one or more estimated color output signals based on the estimate of the unknown illuminant;
(d) calculate a color difference value using at least one of the one or more measured color output signals and at least one of the one or more estimated color output signals; and
(e) calculate a second estimate of the unknown illuminant using the estimate of the unknown illuminant and the color difference value.

40. The system of claim 39 wherein the digital computer is programmed to calculate one or more measured tristimulus values from the imaging system from the one or more measured color output signals from the imaging system.

41. The system of claim 39 wherein the digit computer is programmed to calibrate the imaging system using the second estimate of the unknown illuminant.

42. The system of claim 39 wherein the imaging system is a digital imaging system.

43. The system of claim 39 wherein the imaging system is a film camera.

44. The system of claim 39 wherein the digital computer is programmed to use an optimization technique to calculate the second estimate of the unknown illuminant.

45. The system of claim 39 wherein the digital computer is programmed to use an optimization technique comprising a Simplex method to calculate the second estimate of the unknown illuminant.

46. The system of claim 39 wherein the digital computer is programmed to repeat steps (c)-(e) in iteration until the color difference value is less than a threshold color diference value.

47. The system of claim 46 wherein the digital computer is programmed to calculate one or more measured tristimulus values from the imaging system from the one or more measured color output signals from the imaging system.

48. The system of claim 46 wherein the digital computer is programmed to use the second estimate of the unknown illuminant to calibrate the imaging system.

49. The system of claim 46 wherein the imaging system is a digital imaging syetem.

50. The system of claim 46 wherein the imaging system is a film camera.

51. The system of claim 46 wherein the digital computer is programmed to use an optimization technique to calculate the second estimate of the unknown illuminant.

52. The system of claim 46 wherein the digital computer is programmed to use an optimization technique comprising a Simplex method to calculate the second estimate of the unknown illuminant.

* * * * *

UNITED STATES PATENT AND TRADEMARK OFFICE
CERTIFICATE OF CORRECTION

| | |
|---|---|
| PATENT NO. | : 7,362,357 B2 |
| APPLICATION NO. | : 10/213293 |
| DATED | : April 22, 2008 |
| INVENTOR(S) | : Wade W. Brown, William R. Reynolds and John W. Hilgers |

It is certified that error appears in the above-identified patent and that said Letters Patent is hereby corrected as shown below:

Claim 1, Column 11, Line 60:
Delete the word "produce" and replace it with the word --produced--.

Claim 1, Column 12, Line 10:
Delete the word "standard" and replace it with the word --standards--.

Claim 4, Column 12, Line 26:
Delete the word "obtain" and replace it with the words --obtain a--.

Claim 4, Column 12, Line 31:
Delete the word "and" and replace it with the words --and at least--.

Claim 9, Column 12, Line 52:
Delete the word "optimization" and replace it with the words --optimization technique--.

Claim 18, Column 13, Line 15:
Delete the word "standard" and replace it with the word --standards--.

Claim 21, Column 13, Line 33:
Delete the word "cliam" and replace it with the word --claim--.

Claim 22, Column 13, Line 58:
Delete the word "estmate" and replace it with the word --estimate--.

Claim 26, Column 14, Line 1:
Delete the words "calculating the" and replace them with the words --calculating the new--.

Claim 34, Column 14, Line 38:
Delete the word "vLUES" and replace it with the word --values--.

UNITED STATES PATENT AND TRADEMARK OFFICE
CERTIFICATE OF CORRECTION

| | | |
|---|---|---|
| PATENT NO. | : 7,362,357 B2 | |
| APPLICATION NO. | : 10/213293 | |
| DATED | : April 22, 2008 | |
| INVENTOR(S) | : Wade W. Brown, William R. Reynolds and John W. Hilgers | |

It is certified that error appears in the above-identified patent and that said Letters Patent is hereby corrected as shown below:

Claim 41, Column 15, Line 19:
Delete the word "digit" and replace it with the word --digital--.

Signed and Sealed this

Seventeenth Day of March, 2009

JOHN DOLL
*Acting Director of the United States Patent and Trademark Office*